(12) United States Patent
Karner et al.

(10) Patent No.: US 9,759,247 B2
(45) Date of Patent: Sep. 12, 2017

(54) STRUCTURAL COMPONENT

(71) Applicant: MAGNA STEYR Fahrzeugtechnik AG & Co KG, Graz (AT)

(72) Inventors: Werner Karner, Graz (AT); Franz Mayr, St. Marein bei Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 339 days.

(21) Appl. No.: 14/508,128

(22) Filed: Oct. 7, 2014

(65) Prior Publication Data
US 2015/0098755 A1 Apr. 9, 2015

(30) Foreign Application Priority Data
Oct. 8, 2013 (EP) ..................................... 13187683

(51) Int. Cl.
*F16B 5/08* (2006.01)
*B23K 35/02* (2006.01)
*B29C 65/56* (2006.01)
*B29C 65/00* (2006.01)

(52) U.S. Cl.
CPC ............ *F16B 5/08* (2013.01); *B23K 35/0238* (2013.01); *B29C 65/56* (2013.01); *B29C 65/562* (2013.01); *B29C 65/564* (2013.01); *B29C 66/1122* (2013.01); *B29C 66/21* (2013.01); *B29C 66/43* (2013.01); *B29C 66/721* (2013.01); *B29C 66/742* (2013.01); *Y10T 403/477* (2015.01)

(58) Field of Classification Search
CPC ..... B23K 35/0238; F16B 5/08; B29C 65/562; B29C 65/564; B29C 65/56; B29C 66/21; B29C 66/43; B29C 66/741; B29C 66/742; B29C 66/1122; G06F 17/00; G06F 17/30
See application file for complete search history.

(56) References Cited

U.S. PATENT DOCUMENTS

| | | | | |
|---|---|---|---|---|
| 2,464,541 A | * | 3/1949 | Young ...................... | B23K 1/00 228/135 |
| 2,957,237 A | * | 10/1960 | Regle ....................... | B21J 15/08 228/136 |
| 3,477,115 A | * | 11/1969 | Martin .................. | B23K 20/129 228/114.5 |

(Continued)

FOREIGN PATENT DOCUMENTS

| | | | |
|---|---|---|---|
| DE | 3210310 A1 | 9/1983 | |
| DE | 102004025492 A1 * | 8/2009 | .............. F16B 19/04 |

(Continued)

OTHER PUBLICATIONS

Yoshitsune Murayama, Office Action Japanese Patent Application No. 2014-206557, dated Aug. 25, 2015, 5 pages. Includes 2 pages of English translation.

*Primary Examiner* — Daniel Wiley
(74) *Attorney, Agent, or Firm* — Jordan IP Law, LLC; Todd A. Vaughn

(57) ABSTRACT

A structural component includes a first component; a second component composed of metal; and at least one connecting piece composed of metal and which penetrates the first component at least over an entire thickness of the first component, and is fixed in the first component for rotation therewith. The at least one connecting piece is connected to the second component via welding at an end facing the second component.

20 Claims, 3 Drawing Sheets

(56) References Cited

U.S. PATENT DOCUMENTS

| | | | |
|---|---|---|---|
| 3,524,042 A * | 8/1970 | Bennett | B21J 15/08 219/150 R |
| 3,765,072 A * | 10/1973 | Vollet | H03H 3/007 29/432.1 |
| 3,791,016 A * | 2/1974 | Eberhardt | B21D 39/032 29/21.1 |
| 3,848,389 A * | 11/1974 | Gapp | F16B 19/06 16/385 |
| 3,879,916 A * | 4/1975 | Bigham | F16B 5/0072 403/385 |
| 3,897,623 A * | 8/1975 | Tasaki | B23K 20/12 156/73.5 |
| 3,925,956 A * | 12/1975 | Atkinson | B64C 1/12 403/217 |
| 3,967,091 A * | 6/1976 | Vaughan | B23K 11/18 219/118 |
| 3,988,561 A * | 10/1976 | Vaughan | B23K 11/0006 219/118 |
| 4,067,155 A * | 1/1978 | Ruff | E04B 1/6803 4/498 |
| 4,459,062 A * | 7/1984 | Siebert | B23K 9/23 219/76.16 |
| 4,510,171 A * | 4/1985 | Siebert | B23K 9/23 228/165 |
| 4,733,013 A * | 3/1988 | Hemming | H05K 9/0001 174/353 |
| 4,943,292 A * | 7/1990 | Foux | A61B 17/8047 606/286 |
| 4,990,042 A * | 2/1991 | Szayer | F16B 19/1054 411/29 |
| 5,026,234 A * | 6/1991 | Luhm | F16B 19/06 29/524.1 |
| 5,273,386 A * | 12/1993 | Luhm | F16B 19/06 29/524.1 |
| 5,500,511 A * | 3/1996 | Hansen | B29C 65/3656 156/272.4 |
| 5,536,344 A * | 7/1996 | van Dreumel | B29C 65/0672 156/257 |
| 5,649,781 A * | 7/1997 | O'Boyle | F16B 7/04 29/434 |
| 5,705,796 A * | 1/1998 | Hansen | B29C 65/3656 156/274.2 |
| 6,227,433 B1 * | 5/2001 | Waldron | B23K 20/12 228/112.1 |
| 6,854,634 B2 * | 2/2005 | Litwinski | B21J 15/027 228/112.1 |
| 7,341,176 B2 * | 3/2008 | Lundstrom | B21J 15/02 219/127 |
| 7,347,641 B2 * | 3/2008 | Prichard | B21J 15/02 29/524.1 |
| 7,909,229 B2 * | 3/2011 | Fukuda | B21J 5/063 156/73.5 |
| 8,147,943 B1 * | 4/2012 | Byrd | B64G 1/58 244/121 |
| 9,012,029 B2 * | 4/2015 | Lang | F16B 5/10 219/93 |
| 2001/0038029 A1 | 11/2001 | Weihs et al. | |
| 2001/0052178 A1 * | 12/2001 | Luhm | B21K 1/46 29/525.06 |
| 2002/0019187 A1 * | 2/2002 | Carroll | A61F 13/51462 442/394 |
| 2002/0172576 A1 * | 11/2002 | Keener | F16B 19/06 411/504 |
| 2003/0170422 A1 * | 9/2003 | Heta | B29C 65/605 428/137 |
| 2004/0197534 A1 * | 10/2004 | Miller | B32B 3/266 428/195.1 |
| 2004/0253472 A1 * | 12/2004 | Kennedy | B23K 33/00 428/583 |
| 2005/0051607 A1 | 3/2005 | Wang | |
| 2005/0220533 A1 * | 10/2005 | Prichard | B21J 15/02 403/282 |
| 2007/0068116 A1 * | 3/2007 | Droulez | F16B 5/04 52/782.1 |
| 2008/0304933 A1 * | 12/2008 | Kurata | F16B 3/06 411/55 |
| 2009/0232591 A1 * | 9/2009 | Hethcock | F16B 5/0266 403/166 |
| 2009/0236028 A1 * | 9/2009 | Fukuda | B21J 5/063 156/73.5 |
| 2009/0278371 A1 * | 11/2009 | Fuchs | B23K 11/11 296/29 |
| 2011/0097142 A1 * | 4/2011 | Bassler | B23K 11/0046 403/337 |
| 2012/0034045 A1 * | 2/2012 | Luhm | B21J 15/043 411/360 |
| 2013/0122246 A1 * | 5/2013 | Berger | F16B 5/08 428/119 |
| 2013/0223921 A1 | 8/2013 | Christ | |
| 2016/0193988 A1 * | 7/2016 | Plotzitzka | B60S 5/00 403/266 |

FOREIGN PATENT DOCUMENTS

| | | | |
|---|---|---|---|
| DE | 102010013089 A1 | 9/2011 | |
| DE | 102010013229 A1 | 9/2011 | |
| DE | 102011055044 A1 | 5/2013 | |
| DE | 102012004499 A1 | 8/2013 | |
| GB | 567418 A | 2/1945 | |
| GB | WO 2004085095 A1 * | 10/2004 | B21J 15/025 |
| JP | H01-290847 A | 11/1989 | |
| JP | 07214338 A * | 8/1995 | |
| JP | H07-214338 A | 8/1995 | |
| JP | H09-282959 A | 10/1997 | |
| JP | 2003-145279 A | 5/2003 | |
| JP | 2003-531758 A | 10/2003 | |
| JP | 3702837 B2 | 10/2005 | |
| JP | 2009-115314 A | 5/2009 | |
| JP | 2010-207898 A | 9/2010 | |
| JP | EP 2476549 A1 * | 7/2012 | B32B 7/12 |
| JP | 2013-527804 A | 7/2013 | |
| JP | 2015-083869 A | 4/2015 | |
| WO | 2013/064618 A | 5/2013 | |

* cited by examiner

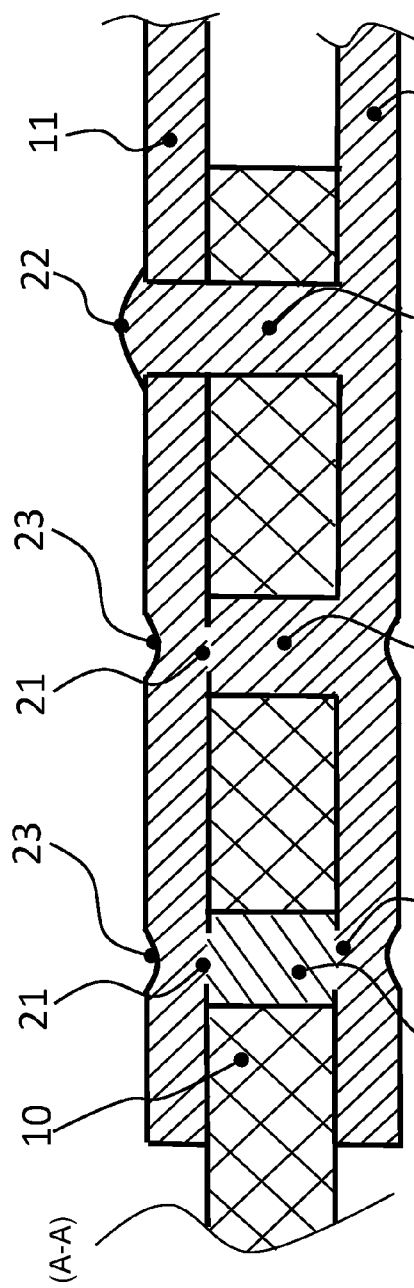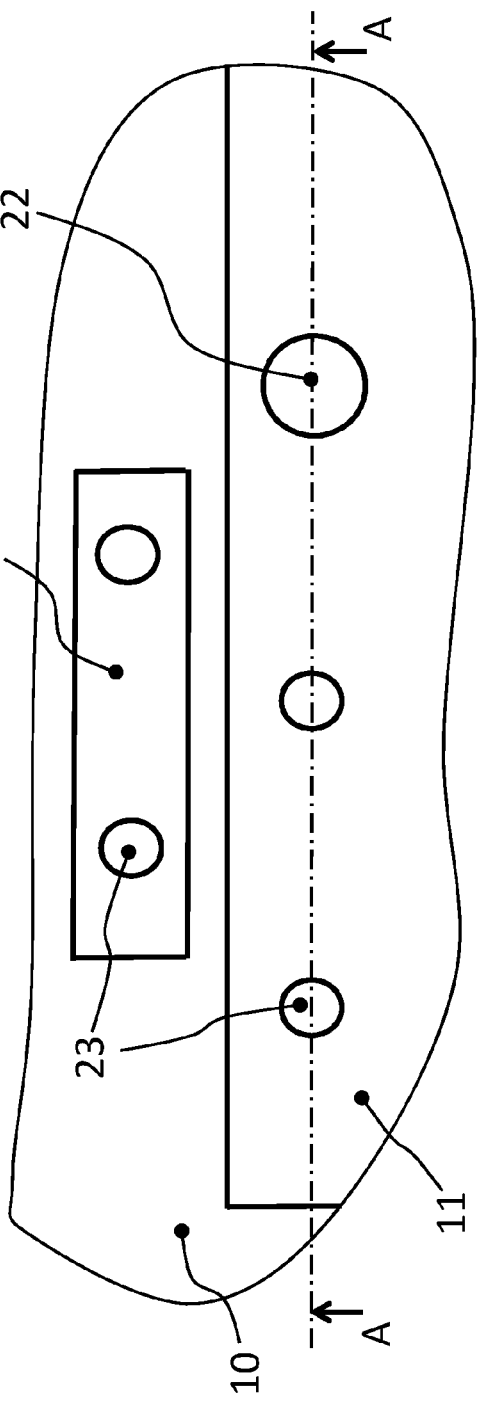

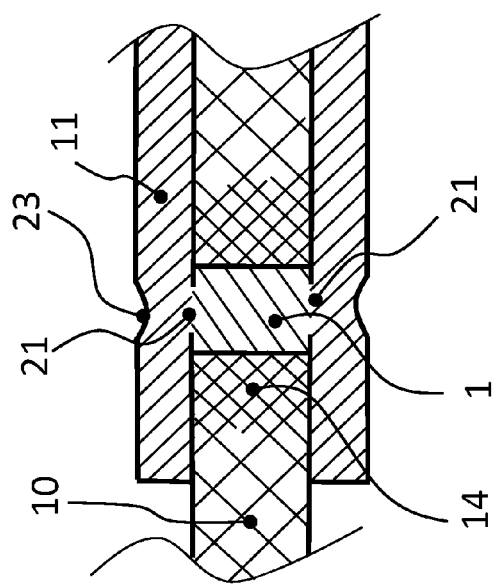
FIG. 2
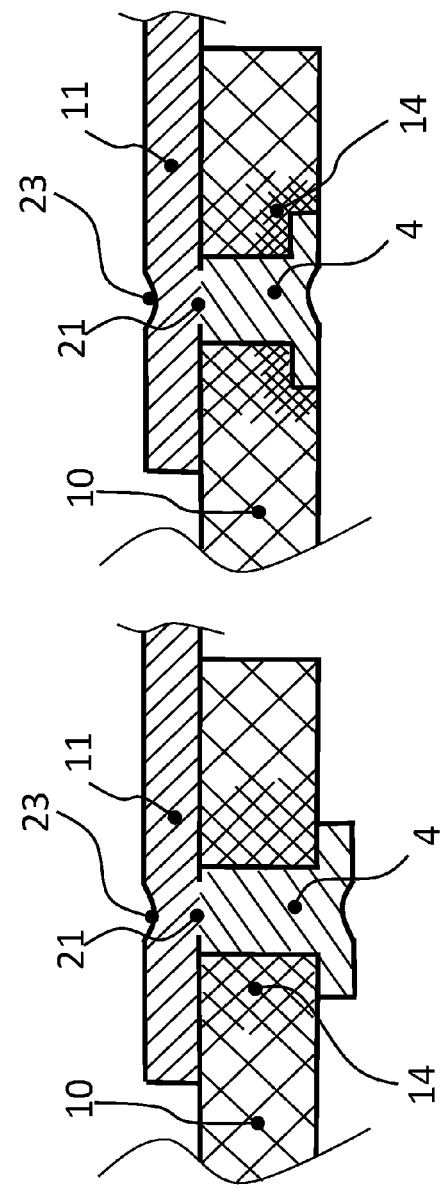
FIG. 3b
FIG. 3a

STRUCTURAL COMPONENT

CROSS-REFERENCE TO RELATED APPLICATIONS

The present application claims priority 35 U.S.C. §119 to European Patent Publication No. EP 13187683.1 (filed on Oct. 8, 2013), which is hereby incorporated by reference in its entirety.

TECHNICAL FIELD

Embodiments relate to a structural component and a method for producing such a structural component including a first component, a second component, and at least one connecting piece made of metal and which penetrates the first component at least over the entire thickness of the first component and fixed in the first component for rotation therewith.

BACKGROUND

Structural components that are made up of at least two components connected to one another are used in a wide variety of areas of technology, for example, as load-bearing structural components in the automobile industry. Usually two or more metal parts are connected to one another to make up a structural component. It has recently also been attempted to replace metal parts entirely or partly by lighter plastic parts or composite parts. Generally, to make up a structural component, connections between components are established by screw connections or riveting the components.

SUMMARY

In accordance with embodiments, a structural component is provided that may be produced simply and reliably in terms of the process, and at the same time has a connection of the components that may bear loads. Such a structural component includes a first component and a second component.

In accordance with embodiments, a simple method for producing such a structural component is provided to which it is possible to make up load-bearing structural components for the automobile industry, for example, from different materials.

In accordance with embodiments, a structural component may include at least one of: a first component, a second component, at least one connecting piece made of metal and which penetrates the first component at least over the entire thickness of the first component and is fixed in the first component for rotation therewith. The connecting piece may be welded to the second component at an end facing the second component, or to a second connecting piece made of metal which penetrates the second component. The second component may be composed of metal.

Therefore, in accordance with embodiments, the metal connecting piece is not laboriously fastened to the second component with a screw nut or some other terminating part, and also does not have to penetrate the second component, but is welded directly to the second component, which may, for example, be a metal plate or a metal shaped part, or else is welded to a second metal connecting piece, which may have been introduced into or incorporated in the second component. The welding may be performed in particular on the surface of the second component that is facing the first component. The first connecting piece, however, may, for example, also penetrate the second component and be welded to the surface of the second component that is facing the first component.

Developments of the invention are specified in the dependent claims, the description and the accompanying drawings.

In particular, the first component is a plate or a shaped part and/or the second component is a plate or a shaped part. A plate or a shaped part should be understood as meaning not only parts that are flat or extend substantially in one plane but also structural components or shaped parts such as for example pressed, forged and drawn parts or profiled bars or sheet-metal forms or locally crimped tubes or cast forms and the like.

The connecting piece may be formed as a cylinder, a pin or a pin with a head, and if applicable so may the second connecting piece. Forms without a head are particularly suitable for connections of three components, the first component therefore being welded at one end to a second component and at the other end of the connecting piece to a third component, or for example a disc. Forms of the connecting piece with a head are in turn particularly suitable for welding the connecting piece only at one end, the head being able to lie against the first component at the opposite end thereof and being able to secure the first component at this end against axial displacement.

In accordance with embodiments, the connecting piece and/or if applicable the further connecting piece is of a solid form, so that in particular a force of over 1000 N, in particular over 2500 N, may be transferred by way of the connecting piece, in order to form a stable, load-bearing structural component.

In accordance with embodiments, the first component may be composed of plastic or a fibre composite, and in particular, may be a plastic panel or a fibre composite panel. The second component may be, for example, a metal plate, composed of steel, in particular, a metal sheet.

In accordance with embodiments, a connection may thus be established between different materials, that is in particular between plastic or fibre composite on the one hand and metal on the other hand.

In accordance with embodiments, the second component may preferably be a metal disc or a metal strip, the metal strip being able in particular to serve as a second component for a number of connecting pieces.

In accordance with embodiments, if a second connecting piece made of metal is used in the second component, the second component may also comprise plastic or fibre composite and be in particular a plastic panel or fibre composite panel.

Preferably, the welding is produced by spot welding, build-up welding, friction welding or else by welding with the aid of a reactive film.

In accordance with embodiments, the connecting piece is connected to the first component with a material bond and/or a form fit. The connecting piece may have a round cross section, but preferably has an oval, triangular, quadrangular, pentagonal or star-shaped cross section in order to enhance the form fit.

In accordance with embodiments, the first connecting piece is designed in the form of a cylinder or a pin and is welded at one end to the second component and at the opposite end to a third component, in particular at both ends to a metal sheet. The third component may, for example, also be designed as a metal disc or a metal strip.

In accordance with embodiments, the first connecting piece is designed as a pin with a head and is welded at the end at which the connecting piece has no head to the second component, in particular a metal sheet.

In a structural component in accordance with embodiments, in addition to the first component there may also be one or more additional components, in particular additional plates or shaped parts, arranged on the connecting piece, so that the connecting piece penetrates the first component and the additional components at least over the entire thickness thereof. The connecting piece may then be welded to the second component, and if applicable, also at the other end to a third component.

A method in accordance with the invention for producing a structural component includes at least one of: introducing a connecting piece into a first component; and after that, connecting the first component to the second component by welding the connecting piece to the second component at an end facing the second component, or to a second connecting piece made of metal which penetrates the second component.

In accordance with embodiments, the connecting piece is incorporated in a plastic or fibre composite panel already during the process of producing the panel, for example, by inserting the connecting piece and winding fibres around it. In this way, the fibres of the first component do not undergo any damage. In addition, a densification of the fibres may be formed around the connecting piece, for further strengthening of the first component in the region of the connecting piece. Even if the connecting piece is only introduced into the first component after the production thereof, it is preferably introduced into a prepared clearance in the first component, so that the component is not weakened or destroyed in the region of the connecting piece by it being forcefully driven in, riveted or nailed.

In accordance with embodiments, a plurality of connecting pieces may be introduced into the first component and, after that, the second component is positioned in relation to the first component and, after that, the connecting pieces are welded to the second component and/or to the further connecting pieces made of metal which penetrate the second component.

Preferably, the welding is produced by spot welding, build-up welding, friction welding or by welding with a reactive film.

In accordance with embodiments, a structural component may include at least one of: a first component; a second component composed of metal; and at least one connecting piece composed of metal and which penetrates the first component at least over an entire thickness of the first component, and is fixed in the first component for rotation therewith, wherein the at least one connecting piece is connected to the second component via welding at an end facing the second component.

In accordance with embodiments, a structural component may include at least one of: a first component; a second component composed of metal and arranged at one side of the first component; a third component composed of metal and arranged at another side of the first component; and a plurality of connecting pieces composed of metal and which penetrates the first component so as to be fixed in the first component for rotation therewith, wherein the third component includes some of the plurality of connecting pieces, and the connecting pieces are connected to the second component via welding at an end facing the second component.

In accordance with embodiments, a method for producing a structural component may include at least one of: providing a first component and a second component; and introducing at least one connecting piece into a prepared clearance in the first component; and connecting the first component and the second component by welding the connecting piece to the second component.

DRAWINGS

Embodiments will be illustrated by way of example in the drawings and explained in the description below.

FIG. 1a illustrates a side, sectional view of a structural component with three connecting pieces in accordance with A-A of FIG. 1b, in accordance with embodiments.

FIG. 1b illustrates a plan view of a structural component with five welding points, in accordance with embodiments.

FIG. 2 illustrates a side view of a second structural component, in accordance with embodiments.

FIG. 3a illustrates a side view of a second structural component, in accordance with embodiments.

FIG. 3b illustrates a side view of a second structural component, in accordance with embodiments.

DESCRIPTION

Figure 4:
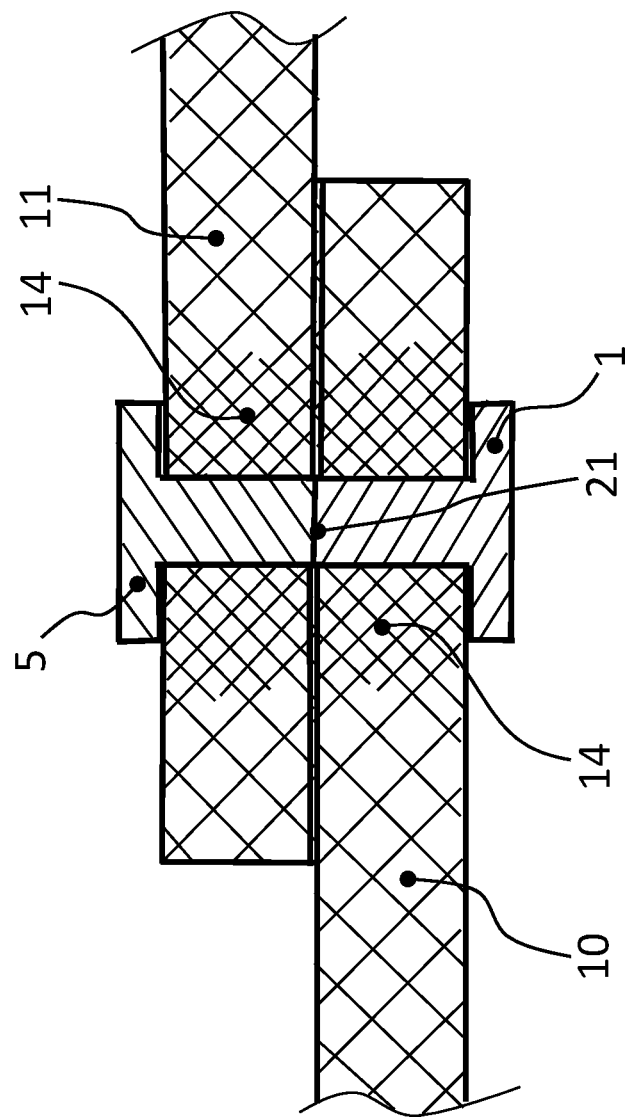
FIG. 4 illustrates a side view of a second structural component, in accordance with embodiments.

In FIGS. 1a and 1b, a structural component in accordance with embodiments is represented, and includes a first component 10 made of plastic or fibre composite and a second component 11, formed, for example, by a metal sheet. The connection between the first component 10 and the second component 11 takes place via connecting pieces 1, 2, 3. The connecting pieces 1, 2, 3 may be composed of metal and take the form of cylinders or pins. The connecting pieces 1, 2, 3 penetrate the first component 10 over the entire thickness of the first component 10. The connecting pieces 1, 2, 3 are fixed in the first component 10, for example, by pressing, adhesive bonding or thermal joining.

The connecting pieces 1, 2, 3 are welded at a respective end facing the second component 11 to the second component 11 in welding zones 21, 22 on the surface of the second component 11 by spot welding or in a welding zone 22 by build-up welding. In the case of build-up welding, welding material may be applied in such a way as to be protrude or raised with respect to the surface of the second component 11 and, for example, be subsequently machined down to a smooth surface. In the case of spot welding, welding points 23 may be created as indentations on the outer surface of the second component. The first connecting piece 1 is also welded at an end remote from the second component 11 to a third component 12, for example, a panel or a shaped part, likewise in a welding zone 21. The connecting pieces 2, 3 on the other hand are already fixed to the third component 12, or made in one piece with it, before the connection of the components 1, 2, 3 to one another.

Additionally represented in FIG. 1b are two additional welding points 23, with connecting pieces 1 lying thereunder, which cannot be seen here and are welded to a metal strip 13 of their own, as a further second component.

FIG. 2 corresponds largely to the variant of a connection that is represented on the left in FIG. 1a. In FIG. 2, however, the connecting piece 1 already has been incorporated in the plastic or fibre composite panel of the first component 10 during the process of producing the panel, for example, by inserting the connecting piece and winding fibres around it. In this way, fibres of the first component 10, for example, do not undergo any damage and there is in addition a strengthening as a result of the densification 14 of the fibres around the connecting piece 1.

In the embodiment represented in FIG. 3a, the first component 10 is only connected at one end to a second component 11. The first connecting piece 4 is designed as a pin with a head. The first connecting piece 4 is welded at an opposite end thereof that has no head, in the welding zone 21, to a metal sheet of the second component 11. The head of the connecting piece 4 secures the first component 10 against axial displacement along the connecting piece 4. The head of the connecting piece 4 may lie against the outside of the first component 10, as represented in FIG. 3a, or else be incorporated flush with the surface of the first component 10, for example, already during the production of the component 10, as represented in FIG. 3b.

As illustrated in FIG. 4, a structural component includes a first component 10 and a second component 11. The first component 10 and the second component 10 11 are connected to one another by way of a first connecting piece 1 made of metal, which penetrates the first component 10, and a second connecting piece 5 made of metal, which penetrates the second component 11. The connecting piece 1 is welded at its end facing the second component 11 to the further connecting piece 5, which penetrates the second component 11.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1, 2, 3, 4 connecting piece
5 second connecting piece
10 first component
11 second component
12 third component
13 metal strip
14 densification
21 welding zone
22 welding zone
23 welding point

What is claimed is:

1. A structural component, prepared by a process comprising:
    forming a first component composed of a fibre composite material by incorporating at least one connecting piece composed of metal during formation of the first component by inserting the at least one connecting piece and winding fibres of the fibre composite material around the at least one connecting piece, such that the at least one connecting piece is to penetrate through the first component at least over an entire thickness of the first component, and such that the at least one connecting piece is fixed in the first component for rotation therewith; and
    arranging a second component composed of metal at one side of the first component and connecting the second component to the at least one connecting piece via a welding process.

2. The structural component of claim 1, wherein the first component is a panel.

3. The structural component of claim 2, wherein the second component is a panel.

4. The structural component of claim 1, wherein the least one connecting piece is formed as one of a cylinder, a pin, and a pin with a head.

5. The structural component of claim 1, wherein the second component is a metal sheet.

6. The structural component of claim 1, wherein the second component is a metal disc or a metal strip.

7. The structural component of claim 1, wherein the at least one connecting piece is connected to the first component by a material bond and/or a form fit.

8. The structural component of claim 1, wherein the at least one connecting piece comprises a cylinder or a pin which is welded at one end to the second component.

9. The structural component of claim 1, wherein the at least one connecting piece comprises a pin with a head which is welded to the second component at an end thereof that has no head.

10. A structural component, prepared by a process comprising:
    forming a first component composed of a fibre composite material, by incorporating at least one connecting piece composed of metal during formation of the first component by inserting the at least one connecting piece and winding fibres of the fibre composite material around the at least one connecting piece, such that the at least one connecting piece is to penetrate through the first component at least over an entire thickness of the first component, and such that the at least one connecting piece is fixed in the first component for rotation therewith;
    arranging a second component composed of metal at one side of the first component and connecting the second component to the at least one connecting piece via welding; and
    arranging a third component composed of metal at another side of the first component and connecting the third component to the at least one connecting piece such that the first component is arranged between the second component and the third component.

11. The structural component of claim 10, wherein the first component, the second component, and the third component each comprises a panel.

12. The structural component of claim 10, wherein the least one connecting piece is formed as one of the cylinder, a pin, and a pin with a head.

13. The structural component of claim 10, wherein the at least one connecting piece is connected to the first component by a material bond and/or a form fit.

14. The structural component of claim 10, wherein the at least one connecting piece comprises a cylinder or a pin which is welded at one end to the second component.

15. The structural component of claim 10, wherein the at least one connecting piece comprises a pin with a head which is welded to the second component at an end thereof that has no head.

16. A method for producing a structural component, comprising:
- forming a first component composed of a first material by incorporating therein at least one connecting piece composed of a second material that is different than the first material during formation of the first component by inserting the at least one connecting piece and winding fibres of the fibre composite material around the at least one connecting piece, such that the at least one connecting piece is to penetrate through the first component at least over an entire thickness of the first component, and such that the at least one connecting piece is fixed in the first component for rotation therewith;
- providing a second component composed of the second material; and
- connecting the first component and the second component by welding the at least one connecting piece to the second component.

17. The method of claim 16, further comprising, after forming the first component, and before connecting the first component and the second component, positioning the second component in relation to the first component.

18. The method of claim 16, wherein the welding comprises spot welding, build-up welding, friction welding, or welding with a reactive film.

19. The method of claim 16, wherein the first material comprises a fibre composite.

20. The method of claim 19, wherein the second material comprises a metal.

* * * * *